July 9, 1963

H. F. PETERSON 3,096,655

BALANCING MACHINE

Filed Feb. 24, 1959

INVENTOR —
HENRY FERDINAND PETERSON
by Donald L. Welsh
— ATTORNEY

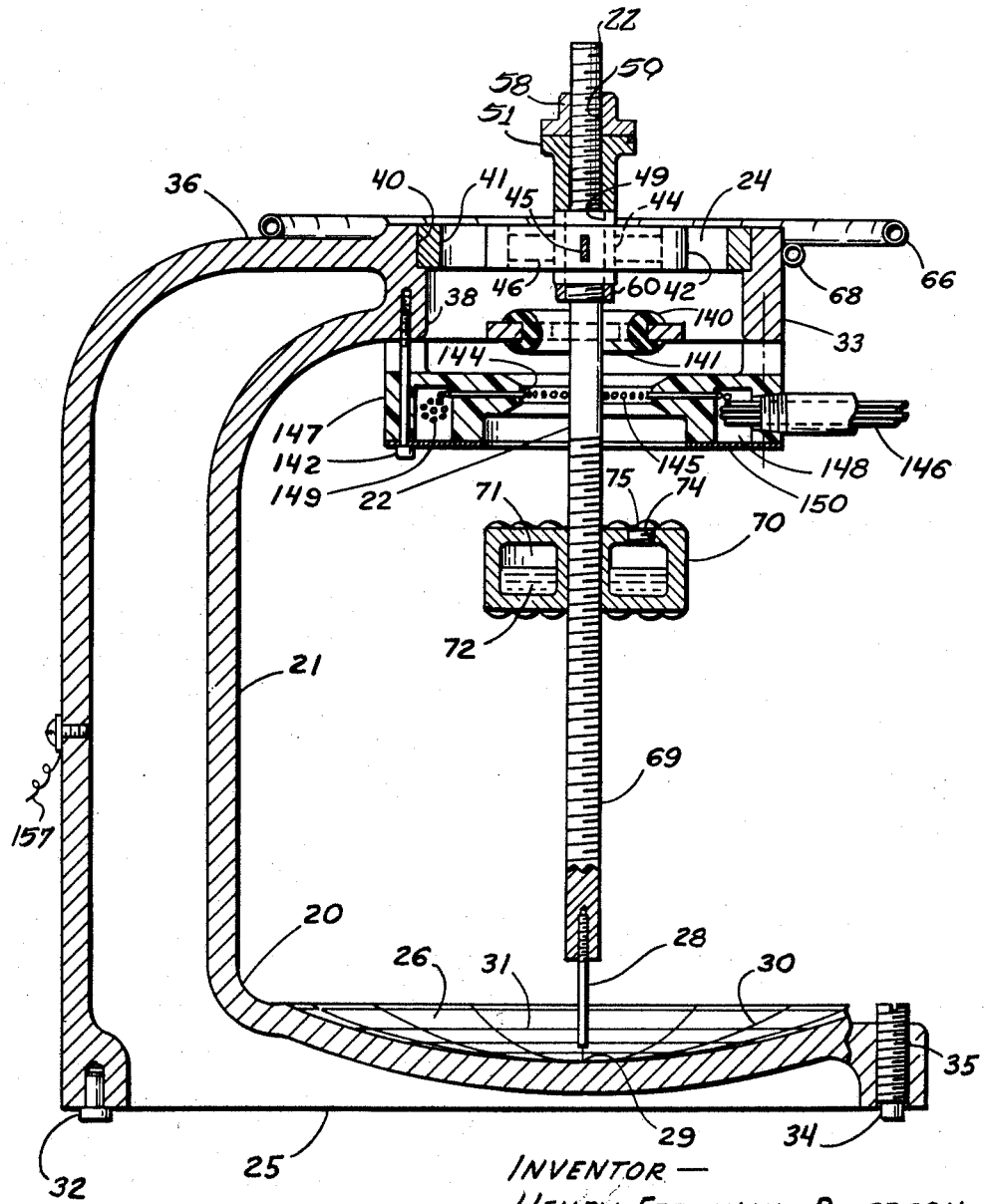

July 9, 1963  H. F. PETERSON  3,096,655
BALANCING MACHINE
Filed Feb. 24, 1959  4 Sheets-Sheet 3
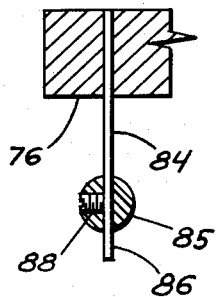
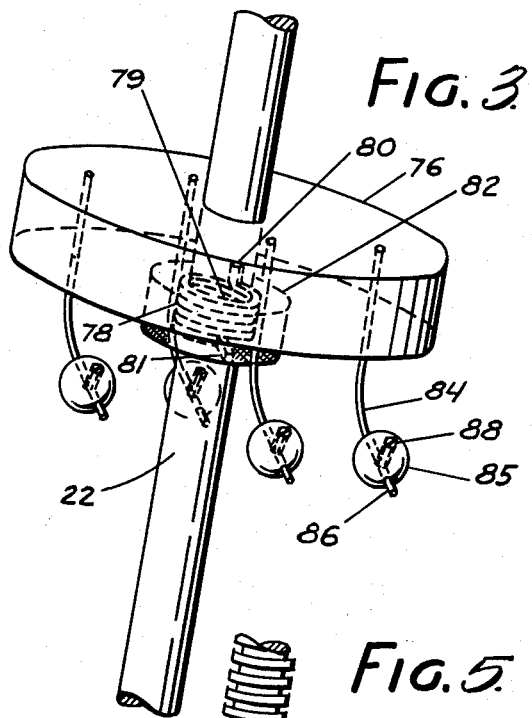
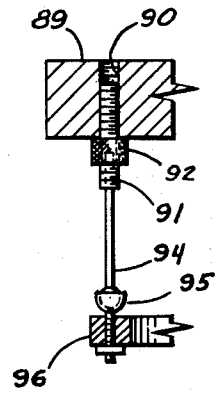
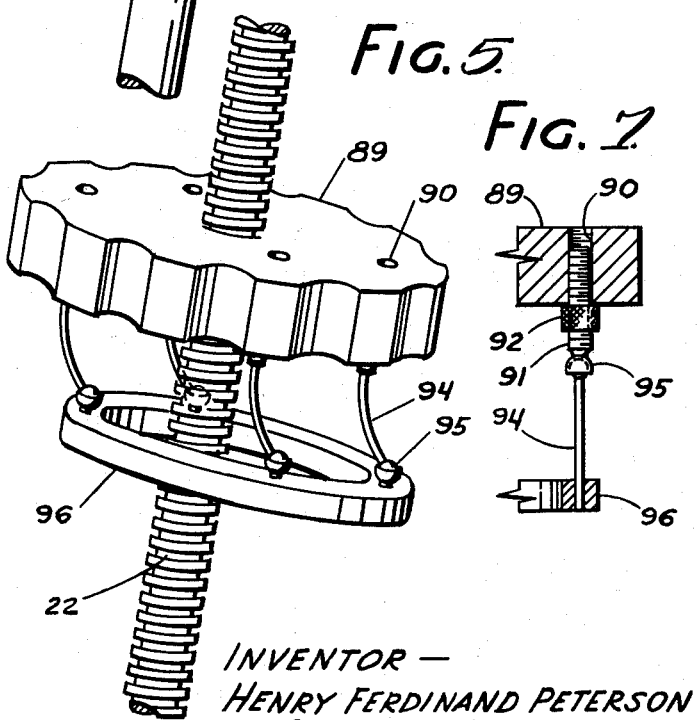
INVENTOR —
HENRY FERDINAND PETERSON
by Donald L. Welsh
—ATTORNEY July 9, 1963

H. F. PETERSON 3,096,655

BALANCING MACHINE

Filed Feb. 24, 1959

INVENTOR
HENRY FERDINAND PETERSON
By Donald L. Welsh
ATTORNEY

United States Patent Office 3,096,655
Patented July 9, 1963

3,096,655
BALANCING MACHINE
Henry Ferdinand Peterson, 2240 Parmele St.,
Rockford, Ill.
Filed Feb. 24, 1959, Ser. No. 795,230
4 Claims. (Cl. 73—483)

This invention relates to apparatus for determining the amount and location of unbalanced masses in a workpiece in an effort to achieve static balance. More particularly, the invention relates to the measurement of static unbalance of a workpiece while the workpiece is mounted on a supporting member movable universally about a pivot point and carrying a counterweight yieldably urging it to a balanced position when the weight of the workpiece is evenly distributed about a vertical axis extending through the pivot point.

The primary object of the invention is to provide novel balancing apparatus of the above character which enables static unbalance to be determined quickly and accurately, which is readily adaptable for use with automatic recording and handling equipment, and which, compared to similar prior apparatus, is of lower cost while still providing quantitative as well as qualitative analysis of the unbalance of a workpiece.

Another object is to mount the work support for universal movement in a novel manner simplifying and reducing the cost of manufacturing and maintaining the apparatus while insuring continuing accuracy over long periods of time.

A further object is to dampen oscillations of the work support by the provision of novel, self-contained damping elements which produce inertia forces opposing acceleration of the work support.

Still another object is to provide novel means for transmitting information respecting the location and extent of unbalance to remote points without reducing the accuracy of the measurement.

Other and further objects and features of the present invention will be apparent from the following description and drawings in which:

FIG. 2 is a vertical sectional view of the device of FIG. 1;

FIG. 3 is a perspective view of a first alternate counterweight and damping means construction adaptable for use in the balancing machine of FIG. 1;

FIG. 4 is a vertical sectional view of one of the damping elements of FIG. 3;

FIG. 5 is a perspective view of a second alternate counterweight and damping means adaptable for use in the balancing machine of FIG. 1;

FIG. 6 is a vertical sectional view, taken from FIG. 5 of a method of adjustably securing the damping means;

FIG. 7 is a view similar to FIG. 6, illustrating an alternate method of adjustably securing the damping means.

Figure 1:
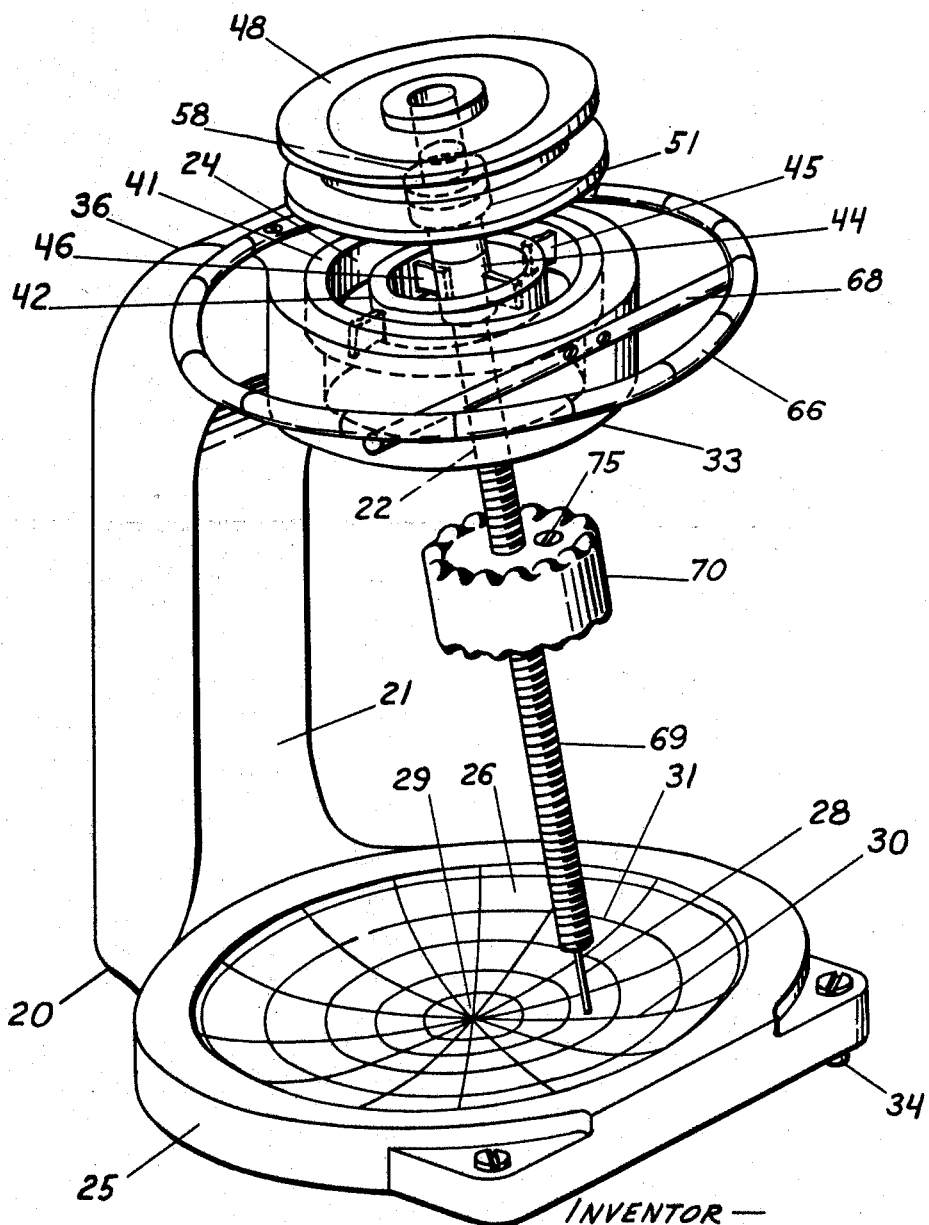
FIG. 1 is a perspective view of a balancing machine illustrating one embodiment of the present invention.

While this invention is susceptible of embodiments in many different forms and combinations, there is shown in the drawings and will herein be described in detail several embodiments with the understanding that the present disclosure is to be considered as an exemplification of the principles of the invention, and is not intended to limit the invention to the embodiments illustrated. The scope of the invention will be pointed out in the appended claims.

Referring now to the drawings, the balancing machine of this invention will be described in detail. The balancing machine is generally indicated as 20 and is seen to consist of a support 21, a spindle 22, and a universal bearing 24 mounted in the support 21 and pivotally supporting the spindle 22 to swing about a center intermediate the ends of the spindle. The workpiece 48 to be tested (FIG. 1) is mounted adjacent the upper end of the spindle and the latter is urged toward a vertical position by a weight 70 secured to the spindle below the universal bearing.

As seen in FIGS. 1 and 2, the support 21 includes a base plate 25 having a concave top surface 26 with a circular spider web dial inscribed therein. The dial 26 is shaped so as to be directly below the indicating tip 28 at the bottom end of the spindle 22 and the center 29 of the dial is directly below the zero position of the indicating tip 28. The dial 26 consists of radial lines 30 extending from the center 29. The lines and circles are oriented so as to indicate the extent and location of the unbalance. Thus, the tip 28 will indicate a radial line which gives an indication of the location of the unbalanced mass with respect to the spindle. The tip will also indicate a circle which indicates the extent of unbalance.

The balancing machine 20 is mounted on a rear leg 32 and two front legs 34. The front legs are adjustable so that the balancing machine may be leveled on an uneven or inclined surface. As seen in FIGS. 1 and 2, these front legs 34 are threaded so that they can be adjusted by screwing in the threaded holes 35 of the base plate 25.

The support is seen to have a gooseneck bracket 36 extending upwardly from the base plate 25 to a point over the dial 26. A vertical cylindrical opening 38 is provided in the upper portion of the gooseneck 36 for the mounting of the bearing 24 and to permit the spindle 22 to extend therethrough. The opening 38 is provided with an annular recess 40 in which the outer ring 41 of the bearing 24 is seated.

To avoid lubricants and reduce maintenance while insuring accuracy in the unbalance measurements, the invention contemplates constructing the bearing 24 as a torsion gimbal having an outer ring 41, an intermediate ring 42 and an inner ring 44 (FIGS. 1 and 2). The outer ring 41 and intermediate ring 42 are connected by a pair of diametrically opposed spring-tensioned ribbons or leaves 45 normally arranged in a vertical plane and stretched between the outer and intermediate rings. Similarly a second pair of spring-tensioned ribbons 46 are stretched between and interconnect the intermediate ring 42 and the inner ring 44 and are positioned in a vertical plane perpendicular to the plane of the first pair of ribbons 45. Thus, a universal bearing is provided whereby the first pair of ribbons permits movement about one axis and the second pair of ribbons permits movement about a perpendicular axis so that the spindle may be moved in any direction under the force of the test piece 48. These ribbons 45 and 46 are preferably formed of a flexible material such as ribbon steel so as to flex with minimum friction and with excellent accuracy, thereby giving a precise indication of actual unbalance of a workpiece 48 mounted on the spindle 22. The torsion type gimbal not only has the advantage of being frictionless, but also requires no dust shield to prevent accumulation of dust which hinders the operation of other types of bearings such as ball bearings.

As shown in FIG. 2, the inner ring 44 of the bearing 24 has a central opening 49 receiving the spindle 22. The latter has its upper end threaded for engagement in the threaded interior 50 of an annular flange portion or sleeve 51. This sleeve abuts the top and a nut 60 abuts the bottom of the inner ring 44 of the bearing to properly position the spindle with respect to the bearing. A workpiece 48 shown in FIG. 1 as an annular sheave is mounted on the top of the annular flange portion 51 through the medium of a cylindrical adapter 58 which is threaded on the upper end portion of the spindle. This adapter selected to accommodate the bore of the workpiece and its size and shape may be varied as required so as to be suitable for the mounting of various types and sizes of test pieces.

A protractor ring 66 is mounted on the gooseneck 36 and to a cross piece 68 extending from the bearing housing 33. This protractor ring 66 is concentric with the spindle 22 has an indicia on its surface to indicate angular positions of unbalance so as to aid in the marking of a work piece mounted on the spindle.

As seen in FIGS. 1 and 2, the portion of the spindle 22 extending below the universal bearing 24 has a threaded surface 69 for the adjustable mounting of the counterweight 70 which urges the spindle toward its vertical position and is provided so that the balancing machine 20 can be adapted for use with various sizes of work pieces and varying amounts of unbalance. When the unbalance of the workpiece would otherwise tend to move the indicating tip 28 of the spindle beyond the limits of the dial 26 the counterweight 70 can be moved down on the spindle 22 to increase the torque of the counterweight. Conversely, the counterweight 70 may be moved upwardly on the spindle 22 to amplify the reading on the dial in the case of a very small unbalance.

In order to reduce oscillations of the spindle 22 and therewith the time for testing a workpiece, novel damping means is provided on the spindle. Generally, this means comprises a mass 72 not only movable with, but also movable relative to the spindle so that its inertia opposes acceleration of the spindle.

In the preferred construction of FIG. 2, the damping mass 72 is a body of flowable material such as oil or mercury partially filling a toroidal cavity 71 in the counterweight 70. A filling hole 74 is provided in the top of the cylindrical counterweight and is normally closed by a plug 75 screwed therein. The liquid 72 moves within the cavity 71 when the spindle 22 moves under the influence of a workpiece that is out of balance and tends to arrest the oscillation of the spindle so that the spindle will come to rest quickly. Another example of a flowable material is fine sand.

FIGURES 3 and 4 show a first alternate embodiment of the counterweight and damping means. In this embodiment the counterweight takes the form of a cylindrical section 76 which is not threaded for engagement with the spindle but rather is adjustably positioned by means of a spring lock 78. As seen in FIG. 3 this spring lock consists of a coil spring 79 surrounding the spindle 22 and having one end 80 attached to the cylindrical section 76 and the other end 81 attached to a collar 82. The counterweight is automatically locked in place about the spindle by the tension existing in coil spring 79. To release the counterweight for adjustment, the collar is rotated relative to the counterweight so as to unwind the coil about the spindle.

The damping means associated with the counterweight of FIGS. 3 and 4 consists of lengths of resiliently flexible or spring-tensioned wire 84 secured in the cylindrical section 76 as by brazing or some other means. The wires 84 are provided with weights 85 such as metal balls secured to their free ends 86 by locking screws 88. Thus, as the spindle 22 oscillates the weights 85 will lag behind because of the spring-tensioned wires 84 and thus tend to arrest movement of the spindle and bring the balancing machine 20 to rest quickly.

FIGS. 5, 6 and 7 illustrate a second alternate embodiment of the counterweight construction. In this embodiment, the counterweight takes the form of a cylindrical section 89 somewhat similar to the cylindrical section 76 of FIG. 3. However, as illustrated in FIG. 5, the counterweight is adjustably mounted on the spindle 22 by threaded engagement therewith similar to the threaded counterweight of FIGS. 1 and 2. The cylindrical section 89 is provided with a plurality of threaded holes 90 in which threaded rods 91 are adjustably mounted and locked in place by lock nuts 92. A spring-tensioned wire 94 is secured to the lower end of each rod 91 and extends therebelow. As seen in FIG. 6, each wire 94 has a ball and socket connection 95 at its lower end which is secured to a damping ring 96. Thus, the ring is suspended by the lengths for movement when the spindle moves to dampen the oscillation of the spindle and bring the balancing machine to rest.

The structure shown in FIG. 7 is similar to that of FIG. 6 except that the ball and socket 95 is attached to the cylindrical section 89 through the rod 91 and the flexible length 94 is attached to the damping ring 96.

To test for static unbalance, a test piece 48 is simply mounted on the adapter 58 and if it is unbalanced, the spindle 22 will immediately move in the universal bearing 24 to a position indicating the direction from the center and the amount of unbalance which can be read directly below the indicating tip 28 of the spindle 22. Thus the operator gets an immediate reading of both the angular position of the unbalance with respect to the workpiece axis and the amount of unbalance expressed in inch-pounds or in any other measuring system depending on the calibration of the dial. When different size test pieces are to be tested, the adjustable counterweight 70 can be relocated on the spindle 22 by applying a known unbalance to the machine and adjusting the counterweight to give the desired reading. Thus, the scope of the balancing machine can be varied to test accurately very small amounts of unbalance or relatively large amounts of unbalance and the full capacity of the dial can be utilized in any case merely by adjusting the position of the counterweight.

In order to protect the spindle 22 against extreme movemetn which could cause damage to either the bearing or other working parts of the machine, a bumper 140 is mounted in the cylindrical opening 38 of the housing 33. This bumper is mounted on a yoke 141 extending across the opening 38 and is circular in shape. It can be formed of any material such as a resilient plastic and preferably is mounted concentrically with the vertical position of the spindle so that when the spindle is urged to an extreme in any direction, it will contact the bumper 140 which will prevent further movement of the spindle and thus protect the machine from damage.

The balancing machine of this invention is easily adaptable for use with electronic sensing apparatus to give an automatic reading of unbalance. This would be an alternate used in place of the dial and indicating tip. Referring to FIG. 2, there is shown attached to the balancing device 20 one type of electronic sensing means for transmitting to a remote point signals to indicate the position of the spindle while avoiding contact or interference with the spindle. Generally, the electronic sensing means comprises a plurality of radially disposed probing elements arranged in an annular series concentric with the vertical position of the spindle. These elements may be simple conducting elements cooperating with the spindle to form a variable capacitance or may be coils cooperating with the spindle to form a variable inductance.

In the sensing apparatus as shown in FIG. 2, a hoop 147 is attached to the underside of the bearing housing 33 and is attached as by screws 142. The hoop 147 has an opening 144 concentric with the vertical position of the spindle and of a size sufficient to permit movement of the spindle in its normal operation without contacting the hoop 147. In the surface of the opening 144 are a plurality of radially located openings receiving the probing elements 145 which are electrodes of the capacity reactance type. The number of electrodes depends upon the number of angular divisions desired to produce the required accuracy of reading. A cable 146, consisting of an insulated wire 149 for every electrode, is mounted in an annular recess 148 in the hoop 147 concentric with and spaced from the opening 144. The recess is covered by a flat ring 150 so as to enclose the cable 146 therewithin.

Figure 8:
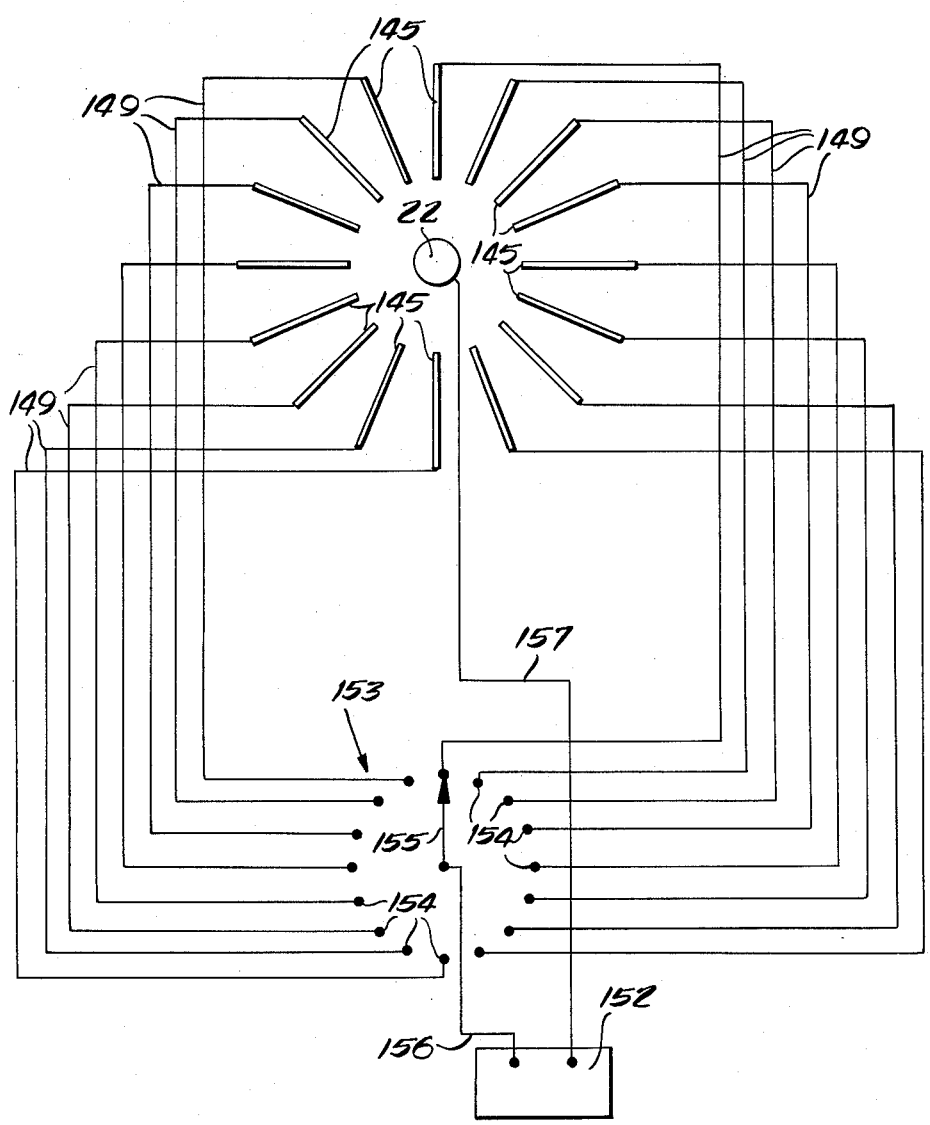
FIG. 8 is a schematic view and electrical wiring diagram of the parts for measuring the direction and extent of unbalance.

In the illustrated capacitance type sensing apparatus, each electrode 145 cooperates with the spindle 22 to form a capacitance which varies in value with the spacing of the spindle from the electrode. This capacitance is measured by a suitable instrument 152 such as a standard capacitance meter (FIG. 8). To enable the same meter to be used for the different electrodes selectively, the electrodes are connected to the meter through a selector mechanism 153. Herein, this mechanism has a plurality of fixed contacts 154 arranged in an annular series and connected individually to the electrodes by the respective conductors 149. A rotary switch arm 155 is connected directly to the meter by a conductor 156 and the capacity measuring circuit is completed by connecting the meter to the spindle. The latter connection extends through a conductor 157 between the meter and the gooseneck 36 which is connected electrically to the spindle through the universal bearing 24.

It will be apparent that, as the rotary switch arm 155 is turned into engagement with the different fixed contacts 154, the electrodes are connected individually to the meter 152 for measurement of the value of capacitance between the electrodes and the spindle. These measurements then may be compared, the angular position of the electrode with the largest capacitance providing an indication of the location of unbalanced weight in the workpiece and the value of capacitance indicating the extent of unbalance. Because the electrodes are out of contact with the spindle, the various readings are accurate and are unaffected by friction and variable contact resistance. Examples of capacitance meters suitable to each electrode are a type FT-Karu meter manufactured by Federal Instruments, Industrial Products Division, International Telephone and Telegraph Corporation of Clifton, New Jersey and the proximity meter capacitance guage manufactured by Fielden Instrument Division of Robertshaw-Fulton Controls Company, Philadelphia, Pennsylvania.

This application is a continuation in part of my copending application Serial No. 697,072 filed November 18, 1957, and now abandoned.

I claim as my invention:

1. Balancing apparatus having, in combination, a base, a work support including an upright spindle with a work receiving member thereon, and a universal pivotal mounting supporting said spindle on said base for swinging in all directions about a point on the axis of the spindle and comprising, an intermediate ring, two inner elongated torsion spring elements of fixed length disposed in a first common radial plane of said spindle on opposite sides of said spindle axis and each secured at opposite ends to and stretched horizontally between said intermediate ring and the spindle, and two outer elongated torsion spring elements of fixed length disposed on opposite sides of the spindle and in a common radial plane of the spindle normal to said first plane and secured at opposite ends to and stretched horizontally between said intermediate ring and said base.

2. Balancing apparatus having, in combination, a base, a work support including an upright spindle with a work receiving member thereon, and a universal pivotal mounting supporting said spindle on said base for swinging in all directions about a point on the axis of the spindle and comprising, an intermediate member, two inner torsion elements in the form of flat metal ribbons disposed in a first common radial plane of said spindle on opposite sides of said spindle axis and each secured at opposite ends to and stretched horizontally between said intermediate member and the spindle, to support the spindle for swinging about a first horizontally disposed axis extending through said point and two outer torsion elements in the form of flat metal ribbons disposed on opposite sides of the spindle and in a common radial plane of the spindle normal to said first plane and secured at opposite ends to and stretched horizontally between said intermediate member and said base to support said spindle and the intermediate member on the base to swing about a second horizontally disposed axis extending through said point and normal to said first axis.

3. Balancing apparatus having, in combination, a base, a work supporting member, and a universal pivotal mounting supporting said member on said base for swinging in all directions about a point on a vertical axis and comprising, an intermediate ring element, two inner elongated torsion spring elements disposed on opposite sides of said axis and in a first common vertical plane and each secured at opposite ends to and stretched horizontally between said intermediate ring and said member, and two outer elongated torsion spring elements disposed on opposite sides of said axis and in a common vertical plane normal to said first plane and secured at opposite ends to and stretched horizontally between said intermediate ring and said base.

4. Balancing apparatus having, in combination, a base, a work supporting element, and a universal pivotal mounting supporting said element on said base for swinging in all directions about a point on an axis of the element and comprising, an intermediate member, two flat inner metal ribbons disposed on opposite sides of said axis and in a first plane including the axis and each secured at opposite ends to and stretched between said intermediate member and said work supporting element to form torsion elements defining a first axis of twisting extending through said point, and two flat outer metal ribbons disposed on opposite sides of said axis and in a common plane normal to said first plane and including the axis and each secured at opposite ends to and stretched between said intermediate member and said base to form torsion elements defining a second axis of twisting extending through said point and normal to said first axis.

References Cited in the file of this patent

UNITED STATES PATENTS

| | | |
|---|---|---|
| 1,136,611 | Pomeroy | Apr. 20, 1915 |
| 1,877,455 | Gordon | Sept. 13, 1932 |
| 1,907,402 | Fedor | May 2, 1933 |
| 2,302,670 | Buchanan | Nov. 24, 1942 |
| 2,308,950 | Hulslander | Jan. 19, 1943 |
| 2,316,524 | Martin | Apr. 13, 1943 |
| 2,338,057 | Petersen | Dec. 28, 1943 |
| 2,720,110 | Lucht | Oct. 11, 1955 |
| 2,751,262 | Federn | June 19, 1956 |
| 2,806,295 | Ball | Sept. 17, 1957 |
| 2,892,152 | Buisson | June 23, 1959 |
| 2,909,063 | Bageman | Oct. 20, 1959 |
| 2,947,175 | King et al. | Aug. 2, 1960 |

FOREIGN PATENTS

| | | |
|---|---|---|
| 888,755 | France | Dec. 22, 1943 |
| 898,367 | Germany | Nov. 30, 1953 |
| 1,166,428 | France | Nov. 12, 1958 |